United States Patent
Sachs et al.

(10) Patent No.: US 9,473,908 B2
(45) Date of Patent: Oct. 18, 2016

(54) METHOD AND APPARATUS FOR A REMOTE SPEAKER MICROPHONE TO INDICATE RADIO BATTERY CHARGE STATE WITH FLASHLIGHT AND STROBE CONTROL

(71) Applicant: MOTOROLA SOLUTIONS, INC, Schaumburg, IL (US)

(72) Inventors: Daniel Grobe Sachs, Elmhurst, IL (US); German Borkhovik, Prairie View, IL (US); Charles B. Jaris, Schaumburg, IL (US); Chirag N. Patel, Hoffman Estates, IL (US)

(73) Assignee: MOTOROLA SOLUTIONS, INC., Schaumburg (IL)

( * ) Notice: Subject to any disclaimer, the term of this patent is extended or adjusted under 35 U.S.C. 154(b) by 286 days.

(21) Appl. No.: 14/078,160

(22) Filed: Nov. 12, 2013

(65) Prior Publication Data

US 2015/0133071 A1    May 14, 2015

(51) Int. Cl.
H04M 11/04   (2006.01)
H04W 4/10    (2009.01)
H04W 4/22    (2009.01)

(52) U.S. Cl.
CPC .............. *H04W 4/10* (2013.01); *H04W 4/22* (2013.01)

(58) Field of Classification Search
None
See application file for complete search history.

(56) References Cited

U.S. PATENT DOCUMENTS

| | | | |
|---|---|---|---|
| 4,959,637 A * | 9/1990 | Woods | G08B 21/0415 340/321 |
| 6,315,425 B1 | 11/2001 | Confrey | |
| 6,653,816 B2 | 11/2003 | Peek et al. | |
| 6,717,520 B1 | 4/2004 | Dorenbosch | |
| 7,215,084 B1 | 5/2007 | Sharrah et al. | |
| 8,654,074 B1 * | 2/2014 | Auguste | G06F 1/1632 345/156 |
| 2003/0137422 A1 * | 7/2003 | Nishibori | G08B 15/004 340/573.1 |
| 2007/0285053 A1 * | 12/2007 | Noguchi | H02J 7/32 320/114 |
| 2009/0289807 A1 * | 11/2009 | Enwright | G08B 25/016 340/691.4 |
| 2009/0291634 A1 | 11/2009 | Saarisalo | |
| 2011/0045870 A1 * | 2/2011 | Bollman | H04B 1/3833 455/556.1 |
| 2012/0176780 A1 * | 7/2012 | Gross | F21L 4/027 362/184 |
| 2012/0220256 A1 | 8/2012 | Tsuge | |
| 2013/0029633 A1 | 1/2013 | Moser et al. | |
| 2013/0049582 A1 * | 2/2013 | West | H05B 33/0824 315/33 |
| 2015/0065186 A1 * | 3/2015 | Mohd Mohdi | H04W 4/10 455/518 |

FOREIGN PATENT DOCUMENTS

| | | |
|---|---|---|
| GB | 2359150 A | 11/2000 |
| WO | 2009144370 A1 | 12/2009 |

OTHER PUBLICATIONS

Petzl Tikka XP, Flashlight Reviews and LED Modificaitons—flashlightreviews.com/reviews/petzl_tikka_xp.html_July2005—4 pages.
NNTN8203—APX XE Remote Speaker Microphone—Motorola Solutions—Copyright 2013—1 page.

* cited by examiner

*Primary Examiner* — Shantell L Heiber
(74) *Attorney, Agent, or Firm* — Barbara R. Doutre (57) ABSTRACT

A communication system (100) formed of a portable radio (102) and radio accessory (106) is provided in which the accessory (106) provides emergency strobe and flashlight modes, the flashlight mode further providing a low battery indicator. Strategic control of lighting triggers and patterns allows for a single high intensity LED (132) to be used for both emergency strobe and flashlight modes, with minimized impact on battery life.

18 Claims, 5 Drawing Sheets

METHOD AND APPARATUS FOR A REMOTE SPEAKER MICROPHONE TO INDICATE RADIO BATTERY CHARGE STATE WITH FLASHLIGHT AND STROBE CONTROL

FIELD OF THE DISCLOSURE

The present invention relates to portable communication devices and, more particularly, to remote speaker microphones operating in conjunction with portable, battery powered two-way radios utilized in a public safety environment.

BACKGROUND

In today's communication environment, a remote speaker microphone is often utilized in conjunction with a battery powered, portable two-way radio to provide a user with remote access to certain key features associated the radio, such as speaker, microphone and push-to-talk (PTT) features. These devices are often used under adverse conditions, such as conditions encountered within the public safety arena involving fire rescue and law enforcement. Dark or smoky environments can make it difficult for the user to see surrounding areas as well as the communication device. An easy to use interface is extremely important when operating under such adverse conditions. Additionally, when working under adverse conditions, excessive current drain of the battery powered, portable communication device can be problematic as the user may not be in a position or location to easily recharge the battery.

Due to minimized size constraints, the design of a remote speaker microphone should minimize the cluttering of too many controls or modules to maintain a logistical user interface. The ability to leave the user's hands free to tend to other matters associated with a mission critical activity, such as holding a hose, carrying equipment and the like, as opposed to fumbling with radio or accessory controls, is extremely important. Additionally, the ability to quickly assess and address a battery state without having to add independent battery state controls would be extremely beneficial to the user.

Accordingly, it would be desirable to have an improved remote speaker microphone for a two-way radio which provides additional functionality without the use of additional modules or controls.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a communication system formed of a portable radio and radio accessory, wherein the accessory provides emergency strobe and flashlight modes, the flashlight mode further providing a low battery indicator. Strategic control of lighting triggers and patterns allows for a single high intensity LED to be used for all operating modes with minimized impact on battery life.

Figure 1:
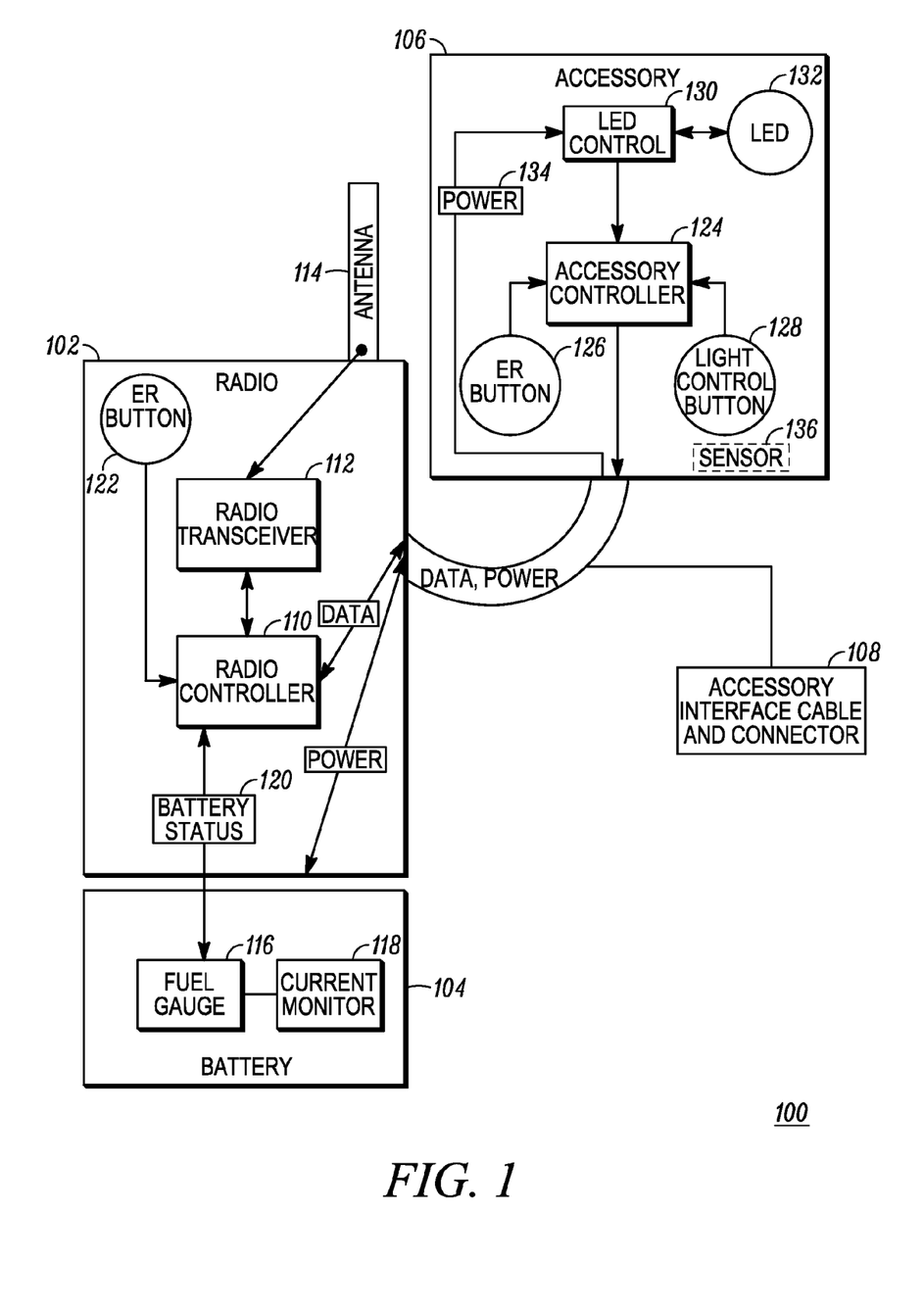
FIG. 1 is a block diagram of a communication system in accordance with various embodiments of the disclosure.

FIG. 1 is a block diagram of a communication system 100 formed in accordance with various embodiments of the disclosure. Communication system 100 comprises a portable radio 102 powered by a battery 104 and further comprising a radio accessory 106, such as a remote speaker microphone (RSM), headset or other accessory which provides remote radio features. The radio 102 and battery 104 provide data and power to the accessory 106 via an accessory interface cable 108. The radio 102 provides two-way radio communication using a radio controller 110, transceiver 112, and antenna 114. Other typical radio components are not shown but are understood to be known in the art of two-way radio communication. The battery 104 comprises battery cells along with a fuel gauge 116 and current monitor 118 through which the radio controller 110 monitors battery status 120 and controls current drain.

The radio 102 further comprises an emergency button 122 which provides an external user interface to provide emergency alerts. In response to a user pressing the emergency alert button 122, a notification is transmitted to either a central base station and/or other members within a talk-group carrying similar devices.

In accordance with the various embodiments, the accessory 106 is powered via the radio battery 104, shown generally by power input signal 134. The accessory 106 further comprises an accessory controller 124 for controlling remote radio functions, as mentioned previously. Examples of such remote radio features may comprise but are not limited to, push-to-talk (PTT), speaker, and microphone functions to name a few. The accessory 106 further comprises first and second user interface buttons operating as an emergency button 126 and a light control button 128 respectively. In accordance with the various embodiments, these buttons 126, 128 trigger a high intensity light emitting diode (LED) 132, coupled to the accessory 106, to operate in a predetermined manner. The various embodiments provided herein allow for the use of the high intensity LED 132, for example a 1 watt LED, by strategically controlling the LED triggers and patterns thereby minimizing the impact of the LED on battery life. The brightness of the LED is visible from a predetermined distance, for example 15-20 feet, for a predetermined environment, such as a smoke filled room, making it well suited for fire rescue applications. The brightness of the LED 132 can be configurable via the accessory controller 124.

The emergency button 122 of the radio 102 is operatively coupled to the emergency button 126 of the accessory 106 through the radio controller 110, accessory interface cable 108, and the accessory controller 124. Thus, the emergency button 122 functions to trigger the SOS indication at the accessory 106. Likewise, in response to the user pressing the emergency button 126 in the accessory 106, the radio controller 110 transmits a notification to the central base station and/or other talk group members.

In response to being pressed, the emergency button 126 and the light control button 128 provide respective inputs to the accessory controller 124. In response to a press of the emergency button 126, the accessory controller 124 enters into an emergency strobe mode. The emergency strobe mode controls LED 132 in accordance with a first predetermined light pattern, referred to as an SOS signal, used within international Morse code. As a visual distress indicator, the SOS signal consists of three short, three long, and three more short flashes of light.

The emergency state strobe can be de-activated in one of two ways. The first way to deactivate the emergency state strobe is to have the host radio 102 exit the emergency state. The second way to deactivate the emergency state strobe is to press the light control button 128 for a predetermined amount of time or a predetermined sequence of presses. This extended hold time protects against an accidental emergency button press.

In accordance with the various embodiments, in response to a press of the light control button 128, the accessory controller 124 enters into a flashlight mode of operation. Alternatively, the flashlight may be turned on automatically, for example in response to a sensor 136, such as a light sensor or smoke sensor, detecting a predetermined threshold of light or smoke.

The flashlight and emergency functionality of the accessory 106 share the same high intensity LED 132. The flashlight is only active in two states, the first state with LED 132 being continuously ON and the second state with LED 132 in predetermined blinking pattern. An extended press time ensures that the user has made a conscious decision to turn on the flashlight. In accordance with the various embodiments, the flashlight mode operates in a continuous ON mode until either turned off by the user or the radio battery runs low. The use of fuel gauge 116 and current monitor 118 in battery 104 advantageously provide a very accurate reflection of remaining battery capacity. When the radio 102 issues a low battery alert to the accessory 106, the user is provided with a visual indication via the blinking LED 132 that the flashlight will be disabled to conserve remaining battery life after a predetermined amount of time. The user is thus able to choose when a high current drain, but non-critical, feature be disabled to preserve battery life.

The flashlight mode can be de-activated (turned off) by pressing the light control button for a predetermined amount of time. The extended press ensures that the user has made a conscious decision to turn off the flashlight mode. The flashlight mode can also be turned off without user intervention when the radio sends a message requesting an emergency indication, as the emergency indication overrides the flashlight functionality. This indication may be triggered, for example by a man-down detector or remotely (i.e., in the case where the user needs to be rescued and the rescuers want to make the user more visible) adding another case where the flashlight can shut down without an explicit command due to detection of a higher priority condition. Enabling of the emergency strobe will override the flashlight function. If the emergency strobe is already on, the flashlight cannot be turned on.

An additional embodiment of the flashlight mode is to enable a predetermined blinking pattern, distinctive from both the SOS pattern and the automated low battery pattern. Enablement of distinctive blinking patterns would still be triggered by different timed or sequenced presses to the light control button 128. This additional safety mode can be useful if the wearer is not in need of continuous light but wants to remain visible to others, such as a commander of a fire rescue team.

Accordingly, the communication system 100, operating in accordance with the various embodiments, provides two modes of operation, the first mode being the emergency mode with the SOS visual indicator of LED 132, and the second mode being the flashlight mode of solid illumination of LED 132 under regular battery charge which, upon receiving a low radio battery input, continues to provide some illumination via the flashing LED 132 in conjunction with providing a low battery indication to the user and others.

The accessory 106 thus provides a user controllable flashlight for at least two use cases: the first usage to illuminate a dark area for visibility, and the second to provide visual location between team members in a dark environment. In accordance with the various embodiments, the communication system 100 advantageously provides tight integration between the radio state, the radio's battery state, and the flashlight/emergency strobe functions on the accessory, focusing on maintaining the user's safety. The flashlight, low battery indicator and emergency strobe functions are integrated between the radio and the accessory locally, thus allowing for localized control. The operation of the LED 132 is completely controlled by the accessory controller 124 in response to user inputs to emergency button 126, light control button 128, automated emergency triggers (e.g. man-down trigger, smoke sensor), and/or low radio battery.

Figure 2:
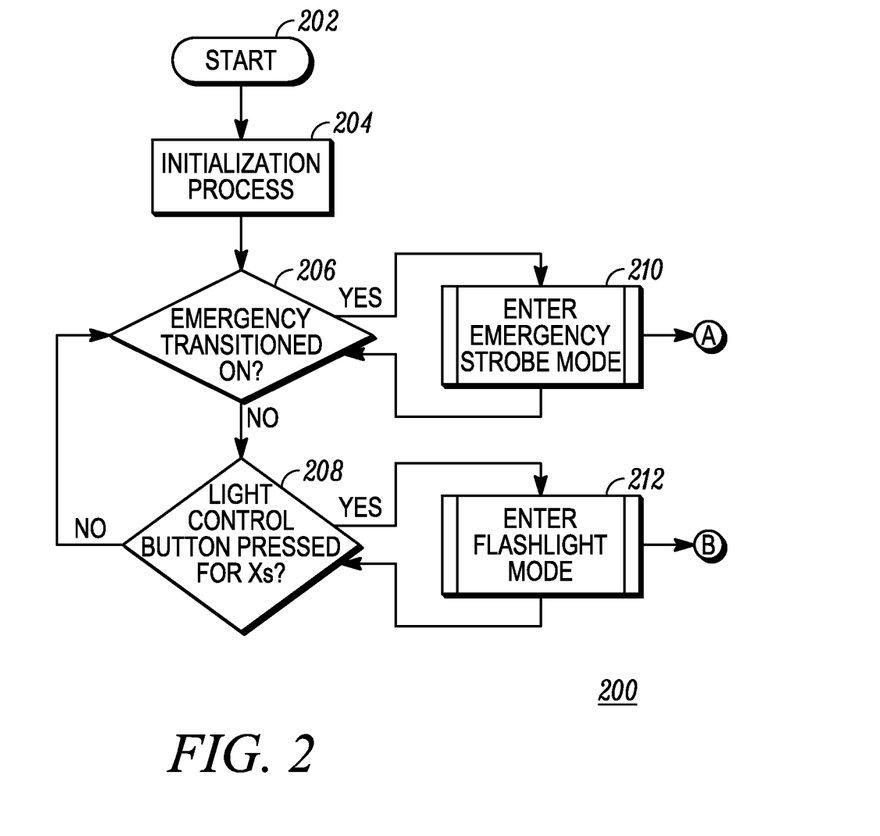
FIG. 2 is a method for a radio accessory to selectably enter emergency strobe mode or flashlight mode in accordance with the various embodiments of the disclosure.
Figure 3A:
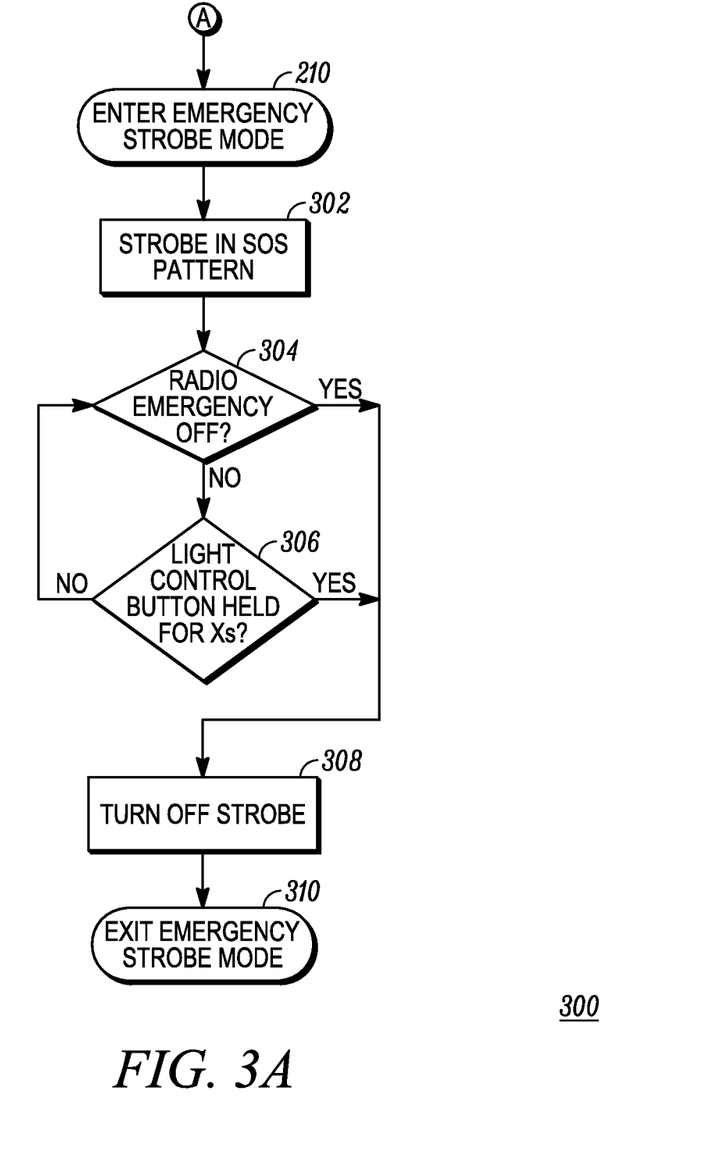
FIG. 3A is a method for emergency strobe operation in accordance with various embodiments of the disclosure.
Figure 3B:
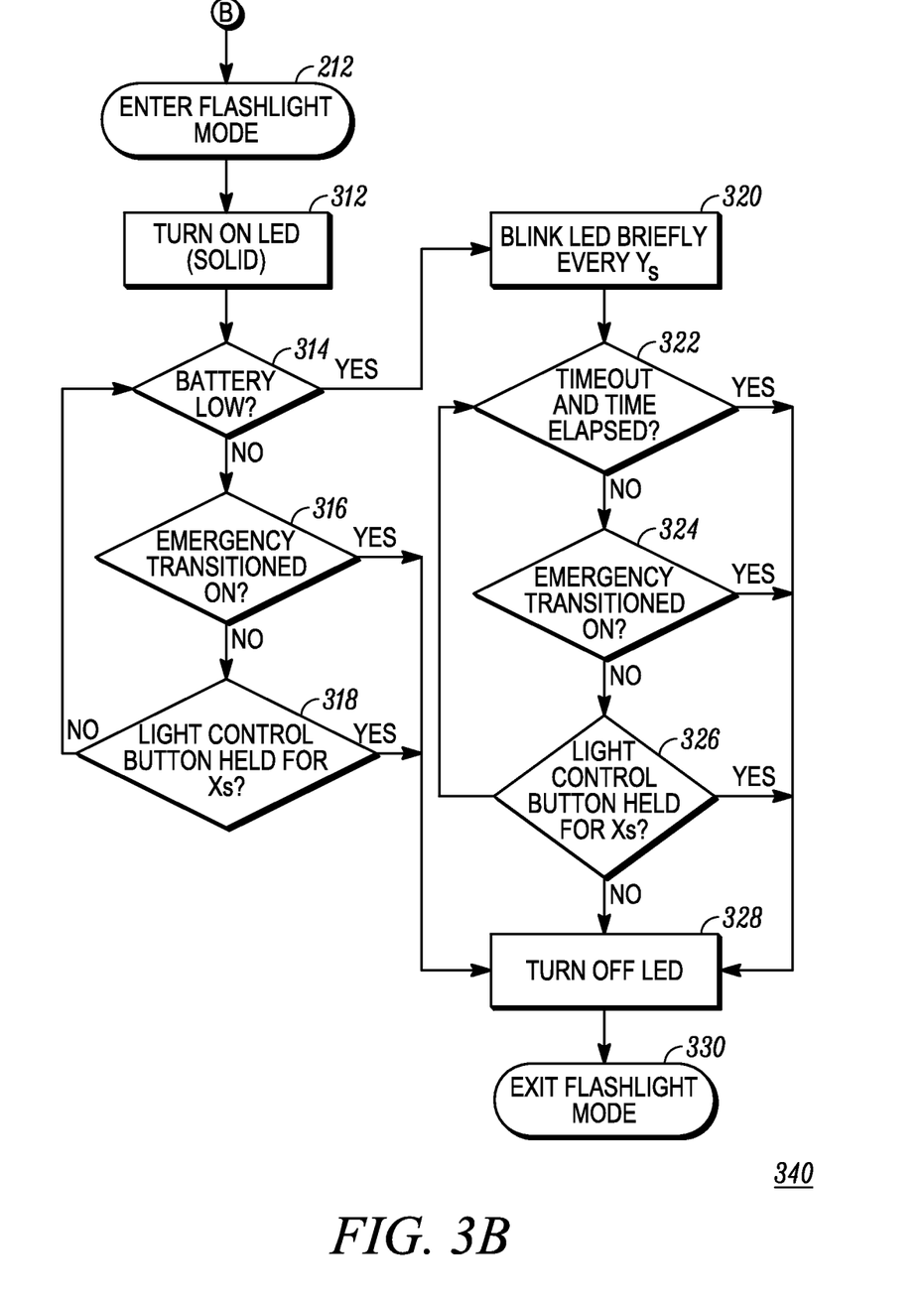
FIG. 3B is a method for flashlight and low battery state operation in accordance with various embodiments of the disclosure.

FIGS. 2, 3A, and 3B provide a process for operating the accessory of FIG. 1. In FIG. 2, method steps 200 introduce the enablement of the two operating modes, emergency strobe mode and flashlight mode. FIG. 3A provides method steps 300 for emergency mode operation, and FIG. 3B provides method steps 340 for flashlight mode operation including a sub-mode of low battery indicator.

Referring now to FIG. 2, method 200 starts at 202 by initializing the process at 204 for example, by running the high intensity LED 132 through different indicator modes comprising: turn on (solid), turn off, blink at predetermined time intervals, and strobe at SOS intervals. Once the initialization is complete at 204, the accessory controller monitors for emergency transitions at 206. Emergency transitions might comprise for example, a man-down condition sensed by a sensor of the radio or accessory, the emergency button 122 being triggered on the radio, or the emergency button 126 being triggered on the accessory 106, and the like. Emergency transitions override all other modes by enabling the high intensity LED 132 to enter and operate in the emergency strobe mode at 210.

Referring to FIG. 3A, method 300 is enabled upon entering the emergency strobe mode at 210. In response thereto, the LED 132 flashes in the specific SOS pattern at 302. As mentioned previously, the SOS signal consists of three short, three long, and three more short flashes of light. Once the emergency is turned off at 304, for example by removing a man-down condition or other condition deemed as an emergency, then the SOS strobe is turned off at 308 and the emergency mode is exited at 310. The strobe light activating the SOS visual alert can also be overridden by pressing the light control button 128 for a predetermined amount of time or in a predetermined sequence at 306. Pressing the light control button at 306, results in turning off the SOS LED strobe and exiting the emergency mode to continue monitoring back at 206.

Referring back to FIG. 2 at step 206, when no emergency alert has been detected, the accessory monitors for the activation of light control button presses over a predetermined amount of time (for example 5 seconds). When the activation button has been pressed for the appropriate amount of time, the LED enters flashlight mode at 212. Alternatively, the LED can enter flashlight mode automatically, such as in response to a sensor sensing smoke or detecting darkness about the accessory.

Referring to FIG. 3B and method 340, once the flashlight mode is entered at 212, the LED is turned on solid for continuous illumination at 312. The accessory then monitors for a low battery condition at 314. With the flashlight mode being turned on and a solid LED 132 being illuminated, there are two ways to turn off the LED. If an emergency transition is detected at 316, the solid LED is turned off at 328 and flashlight mode is exited at 330. If no emergency transition is detected at 316, but the light control button is held for a predetermined amount of time Ys (for example 10 seconds) at 318, then the solid LED is turned off at 318 and flashlight mode is exited at 330. The exiting of the flashlight mode 330 returns the process to 206 to detect for emergency transitions.

If a low battery condition is detected at 314, then the LED 132 blinks at a predetermined rate (for example the LED may flash every 3 seconds) at 320. In accordance with the various embodiments, this low battery indicator blinks is a non-SOS pattern. After the LED has blinked at the predetermined rate, for a predetermined amount of time at 322, such as controlled by a time-out timer of the accessory controller monitoring elapsed time, then the blinking LED is turned off at 328 and flashlight mode is exited at 330, returning back to detect for emergency conditions at 206. Additionally, as the low battery condition depletes at 314, the timing of the blinking LED can be adjusted at 320 to provide further warning to the user of the impending LED shutdown, as the time out timer continues to elapse at 322.

If the timer has not expired at 322 but an emergency alert transition is detected at 324, then the flashing LED 132 is turned off at 328 and flashlight mode is exited at 330 returning the accessory back to monitor for emergency transitions at 206. If an emergency alert is not detected at 324, but the light control button has been pressed down for a predetermined amount of time at 326, then the flashing LED is also turned off at 328 and flashlight mode is exited at 330 returning to monitor for emergency transitions at 206. Thus, the flashing LED can be turned off automatically or via a user input to the light control button.

Accordingly, the process of operating the accessory in accordance with the various embodiments provides a single LED that provides emergency SOS as well as a flashlight mode of solid illumination under regular battery charge and a low battery indication under low battery charge.

Figure 4:
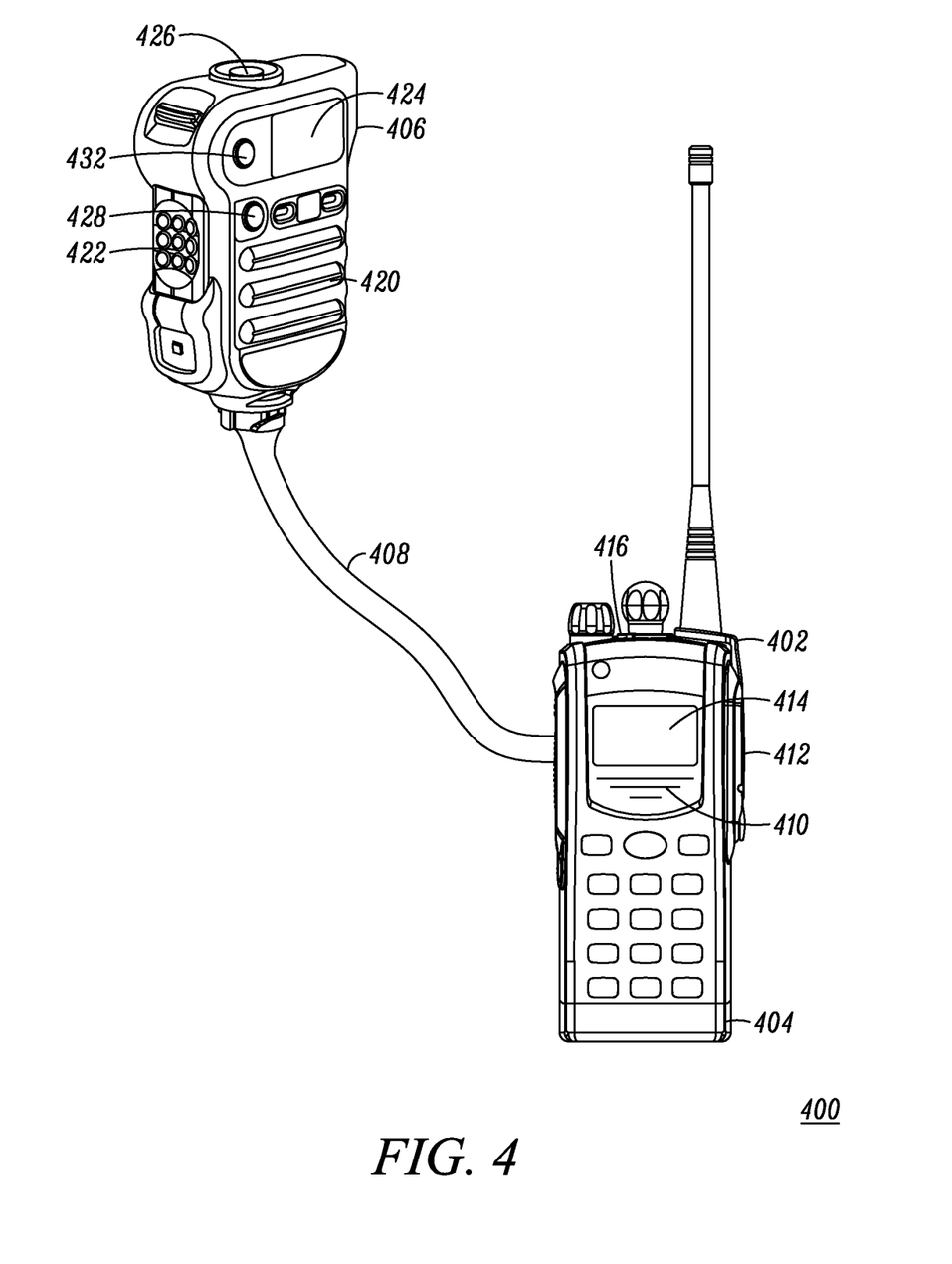
FIG. 4 is a remote radio accessory and radio in accordance with various embodiments of the disclosure.

FIG. 4 is a communication system 400 formed accordance with various embodiments of the disclosure. Communication system 400 comprises a portable two-way radio 402 powered by a battery 404, the radio having an accessory, in this example a remote speaker microphone (RSM) 406, coupled thereto by a cable 408. In the fire rescue environment, the radio 402 provides a host device typically worn on a user's belt beneath a turnout coat, while the RSM 406 is typically worn on the user's coat near the shoulder for easy access to the remote functions. The radio 402 comprises a user interface made up of a speaker grill 410, push-to-talk (PTT) 412, display 414, and an emergency button 416, the emergency button 416 preferably being located on a top surface of the radio 402. The radio 402 and remote speaker microphone 406 are configured in the manner described by FIG. 1.

The remote speaker microphone 406 comprises a user interface formed for example, of a speaker grill 420, a push-to-talk (PTT) button 422, and a display 424. In accordance with the various embodiments, the user interface further comprises an emergency button 426, a light control button 428, and a high intensity LED 432. The high intensity LED 432 is preferably located on a front surface of the RSM 406 and protected by a light pipe. Placement of the LED 432 on the front surface of the RSM 406 allows the light to face forward from the user, thereby minimizing any visual impairment while the high intensity LED 432 is active, while remaining easily visible to the user's colleagues.

In accordance with the various embodiments, the high intensity LED 408 provides continuous flashlight mode, blinking low battery indicator mode, and emergency SOS mode. The high intensity LED 432 is located on a front surface of the RSM 406 so that the LED illuminates forward from the user, such as to illuminate a path, while leaving the user's hands free. The flashlight function is turned on by the light control button 428 and powered exclusively by battery 404 of radio 402. Alternatively, the system 400 may also operate under an embodiment in which the flashlight is turned on automatically, for example, in response to a light sensor or smoke sensor, as previously described.

The flashlight function is controlled via the controller of the RSM 406 in response to user input, the state of the radio battery 404 and the state of the radio 402 in the manner described previously. During the flashlight mode, the RSM 406 monitors the state of the radio battery 404. In response to the RSM 406 detecting a low battery state, the high intensity LED 432 provides a visual warning of impending LED shutoff by going into a periodic blinking mode to warn the user of the depleting battery 404. The timing of periodic blinking can also be varied as the battery depletes.

The RSM 406 automatically turns off the flashlight when the battery 404 reaches a another predetermined low battery threshold and/or time threshold for example a battery capacity of 25 percent thereby avoiding further depletion of the battery. Other thresholds based on time and/or battery capacity may also be used as appropriate to trigger automatic turning off of the flashlight mode as appropriate for maintaining sufficient battery life for radio communications. In response to the low battery blinking LED, the user may opt to turn off certain high current drain communication functions to preserve battery life.

The RSM flashlight mode and blinking mode can be overridden by the system 400 being alerted to an emergency. For example, a man-down trigger by the radio would override and turn off the flashlight mode and trigger the high intensity LED 432 to start emergency SOS strobe signals.

The high intensity LED 432 may further be used, for example, to identify an individual at a public safety scene, such as a commander. The commander may enable, through predetermined timed or sequenced key presses of the light control button 428, a predetermined blinking safety mode which is distinct from the SOS pattern and the low battery pattern. The commander can light up the RSM LED 406 so that others can see him without confusing the LED with a true (SOS) emergency. This embodiment allows the flashlight to be used as part of a safety application.

In accordance with the various embodiments, the system 400 does not rely on any transmissions from a remote radio for triggering. Although the flashlight control is based on multiple inputs, decisions are made and executed by the accessory controller based exclusively on local information the accessory controller has collected from its inputs, such as the radio interface cable, buttons, and sensors. Indications of impending shutdowns are indicated directly by RSM LED 432, rather than the radio 402, which is likely to be worn under the user's turnout coat and not easily visible, and these indications of impending shutdowns are far easier for the user to interpret than indirect notification on a display that is likely to be difficult to see. System 400 advantageously relies on controls embedded in the accessory 406 to intelligently shut down power to an individual accessory function, the continuous flashlight, while retaining power to both the accessory audio functions and to the LED subsystem itself to ensure both voice and SOS functions remain active.

Accordingly, there has been provided a communication system formed of a portable radio and radio accessory, wherein the accessory provides emergency strobe and flashlight modes of operation, the flashlight mode further providing a low battery indicator. The strobe being implemented with a high-power LED advantageously doubles as an emergency or supplemental flashlight, which can be used to illuminate an exit path or when an individual's circumstances preclude the use of a handheld flashlight. The accessory to intelligently monitors and responds to the battery state on the radio. Unlike devices which simply detect a low battery condition, the accessory operating in accordance with the various embodiments is able to directly provide a low-battery flashlight and emergency strobe shutdown. The use of additional modules, controls and batteries has been avoided thereby minimizing size, space and weight to the accessory. The automatic shutdown of the flashlight is advantageous in that further depletion of the battery is avoided thus avoiding failed communications.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communication system, comprising:
    a portable radio having a battery;
    an accessory coupled to the radio, the accessory comprising:
        a light emitting diode (LED);
        a first user interface button for enabling an emergency SOS strobe signal at the LED;
        a second user interface button for enabling continuous lighting of the LED, the LED switching from continuous lighting to a predetermined blinking pattern in response to a low battery indicator by the radio;
        the first user interface button comprises an emergency button that enables an emergency mode of operation;
        the second user interface button comprises a light control button that enables a flashlight mode of operation;
            the emergency mode of operation overriding the flashlight mode of operation; and
            the flashlight mode of operation further providing another predetermined blinking pattern distinct from the emergency SOS strobe signal and distinct from the predetermined blinking pattern associated with the low battery indicator.

2. The portable communication system of claim 1, wherein the accessory is powered solely by the battery of the portable radio.

3. The portable communication system of claim 1, wherein the LED is turned off when the second user interface button is pressed for a predetermined amount of time.

4. The portable communication system of claim 1, wherein a time out timer of the accessory turns off the predetermined blinking pattern after a predetermined elapsed time.

5. The portable communication system of claim 1, wherein the predetermined blinking pattern indicating low battery is distinct from the emergency SOS strobe signal.

6. The portable communication system of claim 1, wherein the accessory comprises a remote speaker microphone.

7. The portable communication system of claim 1, wherein the LED comprises a high intensity LED.

8. The portable communication system of claim 1, wherein the flashlight mode of operation is also enabled automatically by a sensor.

9. The portable communication system of claim 1, wherein the flashlight mode of operation is also enabled automatically in response to one or more sensors detecting a predetermined level of darkness or smoke.

10. The portable communication system of claim 1, wherein the emergency SOS strobe signal strobes in accordance with international Morse code.

11. The portable communication system of claim 1, wherein the portable radio further comprises an emergency button, and the radio emergency button being triggered activates the SOS strobe signal on the accessory.

12. A method of a radio accessory, comprising:
    enabling a flashlight mode of operation in response to a light control button, the flashlight mode of operation providing continuous lighting at a light emitting diode (LED) of the radio accessory until a low radio battery condition is detected, the flashlight mode of operation further providing a predetermined blinking pattern in response to the low radio battery condition; and
    enabling an emergency mode of operation in response to an emergency trigger, the emergency mode of operation generating an emergency SOS strobe signal at the LED of the radio accessory, the emergency mode of operation overriding the flashlight mode of operation; and
    wherein the flashlight mode of operation further provides another predetermined blinking pattern distinct from the emergency SOS strobe signal and distinct from the predetermined blinking pattern associated with the low battery condition.

13. The method of claim 12, wherein theflashlight mode of operation is further automatically enabled in response to a sensor sensing smoke or a light detector detecting darkness at the radio accessory.

14. The method of claim 12, further comprising:
    adjusting timing of the predetermined blinking pattern of the LED as the low radio battery is depleted.

15. The method of claim 12, further comprising:
    de-activating the flashlight mode of operation at a predetermined low radio battery capacity.

16. The method of claim 12, wherein the emergency mode of operation prevents the flashlight mode of operation from being enabled.

17. The method of claim 12, wherein the emergency SOS strobe signal strobes in accordance with international Morse code.

18. The method of claim 12, wherein an emergency button of the portable radio is triggered to activate the SOS strobe signal at the LED of the radio accessory.

* * * * *